April 13, 1948.  S. B. LEVIN  2,439,572
APPARATUS AND PROCESS FOR THE CULTIVATION OF MICROORGANISMS
Filed March 15, 1944  2 Sheets-Sheet 2
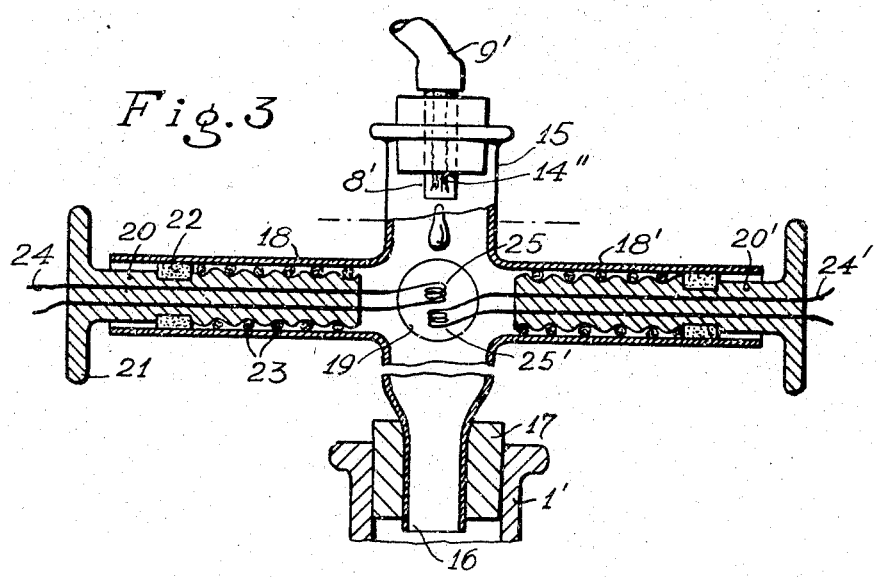
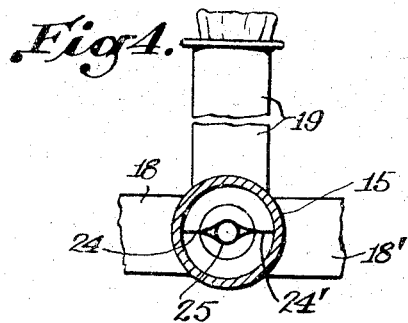
INVENTOR.
Samuel Baruch Levin
BY
his ATTORNEY.

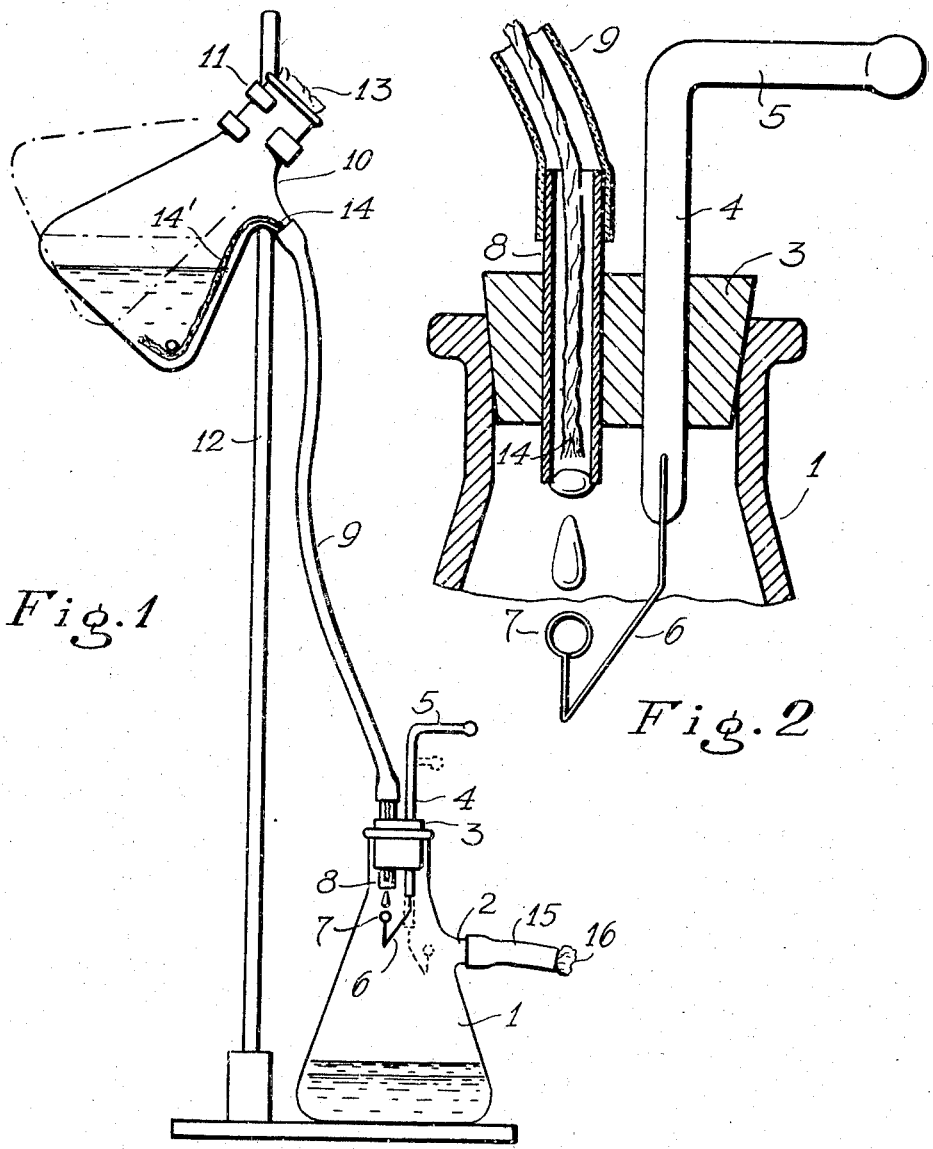

Patented Apr. 13, 1948

2,439,572

UNITED STATES PATENT OFFICE 2,439,572

APPARATUS AND PROCESS FOR THE CULTIVATION OF MICROORGANISMS

Samuel Baruch Levin, Jerusalem, Palestine

Application March 15, 1944, Serial No. 526,644

9 Claims. (Cl. 195—79)

This invention relates to the cultivation of microorganisms, which term is used in a broad sense and includes bacteria, mono-cellular plants, like yeast, algae or others, and mono-cellular protozoa, like amoebae, spirochetes and others, and to the recovery of products of metabolism of such microorganisms.

It is one object of the invention to provide a method of cultivating microorganisms whereby the sequence of generations can be greatly accelerated as compared with known plate or broth cultures.

A further object of the invention is to provide a method by which a pure culture of a microorganism possessing certain desired characteristics can be obtained within a relatively short time, with the elimination of microorganisms that are of the same strain but lack such characteristics.

Another object of the invention is to provide a method allowing to keep the composition of the culture medium practically constant within narrow limits, and particularly to remove from the colony to be further cultivated the products of metabolism excreted by the growing microorganisms.

A further object of the invention is to provide a method by which the virulence of pathogenic microorganisms can be attenuated or even practically brought to avirulence, or desired functions of non pathogenic, for example, industrial microorganism can be evolved.

A further object of the invention is to provide a method of producing varieties of microorganisms that are capable of living and propagating under certain desired conditions of temperature and/or milieu by gradually inuring successive generations of the microorganisms to the desired conditions and at the same time eliminating those which cannot be habituated thereto.

A further object of the invention consists in the recovery of products of metabolism of microorganisms growing in a permanent culture.

It is also an object of the invention to provide apparatus for cultivating microorganisms with a view to attaining any of the objects of the invention mentioned hereinbefore, or to obtain other advantages, as will appear from the following detailed description of the invention.

With the foregoing objects in view, the invention consists in a method of cultivating microorganisms wherein a culture of microorganisms is made to grow in a small quantity of liquid culture medium contained in a very small receptacle; further quantities of culture medium are gradually dropped into said receptacle in an amount exceeding the capacity of the latter; and the bulk of the culture liquid is allowed from time to time to flow away from said receptacle.

This method may serve, for example, for the production, by way of sub-cultures, of strains of the desired purity and/or characteristics. Where this is the object of the process, a quantity of culture medium originally filled into said receptacle is inoculated with the microorganism to be cultivated, and from the culture thus developing, small amounts are from time to time withdrawn as inocula for further cultivation while the original culture may be interrupted when the sub-cultures are made. The liquor flowing off from the culture is, as a rule, without value and may be rejected.

On the other hand, in certain cases it may be important to utilize the liquor flowing off from the culture, and it may even be more important to recover this liquor than to obtain inocula for sub-cultures. In such cases, the culture may be kept in the said receptacle for a long time, and indeed for a practically unlimited time unless it degenerates, while the liquor flowing off from the culture is collected and withdrawn for further working up.

The invention may be carried out, for example, thereby that in a suitable flask, a loop of a non-corrosive material, such as platinum, is suspended in a vertical, horizontal or oblique position, such loop being so made that a lamella can be formed by one or a few drops of liquid culture medium over the surface enclosed by the loop; so much liquid culture medium is first brought on the loop as to form a lamella, and inoculated, and further small quantities of culture liquid are dropped intermittently onto the loop from a capillary dropping tube, a wool or cotton thread or in any other suitable manner. Each fresh drop mingles first with the liquid contained within the loop, then the excess of liquid beyond what the loop can carry drops off and collects on the bottom of the flask, carrying with it a large part of the microorganisms grown in the liquid within the loop, and a large portion of the products of metabolism of the microorganism collecting in the liquid in the loop. Thus, the composition of the culture medium is kept substantially constant, which is not the case with liquid culture media in the hitherto usual cultivation processes, and it is thus possible to maintain a composition of the culture optimal for the growth and existence of those microorganisms which it is desired to cultivate. Moreover, it is the most quickly multiplying microorganisms that gradually predominate, while the slower growing ones are gradually eliminated. From the liquid contained in the loop, a portion may from time to time be sampled by means of a Pasteur pipette or by any other suitable means in order to serve as an inoculum, while the liquid collecting on the bottom of the flask may be withdrawn for further treatment.

Where it is intended to gradually habituate the microorganisms to certain defined conditions of living different from those to which they have been accustomed, the liquid culture medium supplied to the growing culture may gradually be varied in the desired direction.

For example, where a strain of yeast capable of entertaining alcoholic fermentation even at a rather high concentration of alcohol in the mash is to be produced, the supply of liquid culture medium is gradually added to with alcohol until such concentration thereof is reached as corresponds to the proposed practical conditions, and one continues to cultivate the yeast in a culture liquid so enriched with alcohol until quite a number of sub-cultures show that the yeast has become accustomed thereto.

Other examples of industrial microorganisms that can in this way be accustomed to special conditions are:

Acetic-acid-producing bacteria as regards high concentrations of alcohol and acetic acid; lactic-acid-producing bacteria as regards high concentrations of lactic acid; yeast as regards essential oils, in order to obtain a variety that can ferment essential-oil-containing fruit, such as citrus fruit; fermenting microorganisms that can live and ferment in the presence of antiseptic substances, such as sulfur dioxide, which prevent the growth or activity of contaminating microorganisms.

Nor is it only the chemical milieu in respect of which the inherent characteristics of microorganisms can be systematically varied by the gradual variation of the conditions under which they are being cultivated. For example, variations of the temperature optimum can be produced by the gradual heating or cooling of the contanier in which the cultivation takes place, and/or of the culture liquid dropped onto the growing culture. This can be important, for example, in the case of industrial microorganisms that are apt to be contaminated with, and to suffer from, undesired microorganisms, for example, Torula or butyric-acid-producing bacteria in the case of the production of baker's yeast. If the optimal conditions of living of the desired microorganisms are very similar to those of the undesired ones as regards both the chemical milieu and the temperature, the principal or pure-culture microorganisms may be inured to another temperature, either higher or lower than its original optimum, at which the growth and activity of the parasitic microorganisms will be impeded.

The introduction of such variations of the characteristics of microorganisms requires, as a rule, the passage in vitro of the culture through a large number of generations which is a very cumbersome thing to do with the hitherto usual plate or broth media but which succeeds quickly and exceedingly well with the method according to this invention.

Instead of one metal loop, two such loops can be provided movable independently from one another so that each of them can alternately be brought into a position vertically above or beneath the other one, and each can be withdrawn to the side. In this way, if the growing culture is in the upper loop and the other loop is beneath it, and a drop of liquid culture falls on the upper loop, liquid will drop from the upper on the lower loop and will form there a lamella inoculated with the culture, whereupon the upper loop is drawn to the side and sterilized while the culture is continued in the freshly inoculated loop. After some time the process is reversed, the loop which formerly had been the lower and meanwhile the only one is so turned as to come into the upper position, the sterilized other loop is located directly below, supplied with a portion of inoculated culture liquid, and so forth. Like in the manner of putting the invention into practice described above, small amounts of the culture growing in the loops are withdrawn from time to time.

Several apparatus for carrying out this invention are illustrated, by way of example only, in the accompanying drawings and will be described hereinafter in greater detail.

In the drawings:

Fig. 1 is an elevation of an apparatus with single metal loop as receptacle for the liquid culture medium;

Fig. 2 is a fragmental axial section, on a larger scale, of part of the apparatus aforesaid;

Fig. 3 is a fragmental vertical section of an apparatus containing two metal loops;

Fig. 4 is a fragmental horizontal section on line IV—IV on Fig. 3.

Turning first to the embodiment of the invention illustrating in Figs. 1 and 2, a usual laboratory suction filter flask 1 with suction tube 2 is stoppered by a cork or rubber stopper 3 having two vertical bores, while the suction tube 2 is closed by a plug 16 of cotton or the like, inserted in the free end of a length of rubber tubing 15 drawn over pipe 2. In one of said vertical bores, a rod 4 of glass, ebonite, artificial resin or any other suitable material is inserted with a tight fit so that it can be shifted along, and be turned about, its axis and retains any position into which it is brought in this way. The outer end of this rod is bent and forms a handle 5. To its lower end, a wire 6 of a non-corrosive metal, like platinum or nickel-chromium alloy, is secured. This is so bent that its free end points upwardly and the loop 7 formed at its very end lies in a vertical plane beneath the length of pipe 8 which is inserted in the second bore of said stopper 3. The upper end of pipe 8 is connected by a flexible rubber or the like tubing 9 to the suction pipe of a second filter flask 10 which is fastened by means of a turnable clamp 11 to a stand 12 and is stoppered by a plug 13 of sterile cotton wool. A thread 14 of wool, cotton or any other capillary, liquid-conducting material is inserted in tube 8, its one end dipping into the liquid contained in flask 10 while its other end reaches down into pipe 8. Flask 10 contains sterilized liquid culture medium which rises in the branch 14' of thread 14 within flask 10 and then descends in the thread down into pipe 8 whence it drops down onto the loop 7. When by the first drop or drops, a liquid lamella has formed in the loop, the rod 4 is lowered and turned so that the loop is brought into a position, shown in dotted lines in Fig. 1, in front of the inner mouth of suction pipe 2. Then the tube 15 is taken off, the liquid contained in the loop is inoculated by means of an inoculum located on the point of a platinum wire introduced through pipe 2, whereafter the pipe 2 is closed again by tube 15 and the loop 7 brought back into the position shown in full lines in Figs. 1 and 2. From now on, every further drop of liquid falling on the loop mingles with the liquid there present, and the excess of liquid beyond the capacity of the loop drops down on the bottom of flask 1, taking with it a substantial part of the products of metabolism secreted by the microorganism growing in the liquid lamella contained by the loop, and of microorganism. Thus, the composition of the liquid culture medium in this loop remains substantially constant, as selected for the cultivation of a particular microorganism. The rate of delivery of liquid culture medium to the loop can be regulated at will by varying the inclination of flask 10 for, with a given amount of liquid contained in this flask, the flow of liquid through the thread will be the quicker, the smaller the height of the ascending branch 14' of the thread above the liquid level in the flask, that is, the more the flask is inclined.

In the embodiment shown in Figs. 3 and 4, the culture is not kept in the filter flask 1' but in an attachment having an upper cylindrical section 15 drawn out at its bottom into a tube 16 which is inserted in the single bore of a stopper 17 sealing the flask 1'. The attachment has three horizontal tubular extensions 18, 18' and 19, the former two in alignment, the latter at right angle to the former, and all the three substantially at the same height. In the extension 18, a rod 20 is slidably inserted. This has at its outer end, outside the extension 18, a knob 21. Inside extension 18, an annular groove is formed in the rod in which a rubber washer 22 is inserted which gives the rod a tight fit in said extension. Moreover, the inner part of the rod has a spiral groove into which a sterile wool or cotton thread 23 is wound which has the purpose of serving as a filter, preventing the penetration of germs into the attachment. A double-wire 24 of non-corrosive metal passes through rod 20 into the center of the attachment where it forms a loop 25 consisting of several turns. This loop is arranged slightly eccentrically relative to the axis of rod 20 so that by turning the rod, one can alter the position of the loop within the attachment. Into extension 18', a rod 20' is inserted which is in every respect an exact counterpart of rod 20 and bears a loop 25' at the end of the wire 24'. Fig. 3 illustrates a position in which loop 25 is located vertically above loop 25' and vertically beneath the end of the pipe 8' through which the liquid culture medium, supplied by a thread 14'' from a flexible tube 9', drops in the same way as in the case of the arrangement shown in Figs. 1 and 2. The position here illustrated is the "changing" position in which a culture growing in loop 25 is being transferred to the previously emptied and sterilized loop 25' by the drop of liquid culture medium that is about to descend onto loop 25. When this is completed, the operator withdraws rod 20 outwardly and turns rod 20' so that the loop 25' comes into the position formerly occupied by loop 25. The culture then continues to grow in loop 25' while loop 25 is cleansed and sterilized by sending an electric current through wire 24 so as to heat this wire up to sterilizing temperature. The excess of liquid flows off through tube 16 into flask 1'. Sampling of the culture from either loop 25 or 25' is done through the extension 19, for which purpose the loop from which such sample is to be taken is turned into a vertical position in front of the inner mouth of extension 19.

This arrangement has the advantage that the cultivation can go on without interruption for a practically unlimited time in a sealed vessel excluding any contamination. The alternating sterilization of the loops helps in the promotion of the desired variation by the elimination of such microorganisms as may have grown outside the loop and may not have participated in the gradual variation of the strain.

It is a matter of course that the apparatuses illustrated and described by way of example can be modified in various manners within the scope of this invention. Thus, for example, the flask 1 of Figs. 1 and 2, or flask 1' of Fig. 3, can be replaced by a larger container in which a plurality of cultivating loops are arranged, with separate culture medium supply pipes leading to every loop, which supply pipes may be fed from one common store flask or from separate flasks.

Moreover, a drain may be arranged at the bottom of the flask or larger container where the liquor collects after flowing off from the culture, for allowing this liquor to be continually or intermittently drawn off from such flask or container in order to be further worked up or rejected, as the case may be.

It has been found that the method of cultivating microorganisms according to this invention succeeds particularly well if the number of microorganisms per unit of the liquid culture medium is kept small in comparison to what is usual with broth cultures, and the feed of culture medium to the culture proceeds at such a rate that the concentration of the medium by way of evaporation is insignificant. It has also been ascertained that the lag time is virtually abolished by the method according to this invention and the rate of succession of generations is enormously increased.

Experiments carried out with *B. anthracis* have shown that the bacillus automatically subcultures, at a temperature of 27° C., about every 3 minutes without sporulation whereby a complete attenuation, amounting to virtual avirulence, is obtained in a relatively short time. Under optimal conditions of the rate of dropping, the new method has given, in actual experiments, in one year's sub-cultivation the equivalent of about 500 years' culture in ordinary media in the usual way, as far as the number of sub-cultures is concerned, and of a few hundred years in terms of numbers of generations. Similar experience has been gained, for example, with *Vibrio cholerae, Pasteurella pestis* and kinds of *Shigella*. The new method is thus particularly applicable in the manufacture of vaccines.

I claim:
1. An apparatus for cultivating microorganisms, comprising a vessel sealed against the entrance of microorganisms; at least one loop of non-corrosive material capable of holding a very small quantity of liquid culture medium freely arranged within said vessel above the bottom thereof; and means for gradually supplying liquid culture medium from outside said vessel to said loop.

2. An apparatus for cultivating microorganisms, comprising a vessel sealed against the entrance of microorganisms; at least one loop of non-corrosive material capable of holding a very small quantity of liquid culture medium freely arranged within said vessel above the bottom thereof; and means for gradually supplying liquid culture medium from outside said vessel to said loop; and a passage for giving access to said loop through the wall of said vessel.

3. An apparatus for cultivating microorganisms, comprising a flask with top opening and lateral pipe connection; a stopper with two vertical bores inserted in said top opening; a rigid tube inserted in one of the bores of the stopper; and a rod slidingly and turnably inserted in the second bore of the stopper; and a loop of a non-corrosive material fastened to the end of said rod within the flask, said loop being adapted to be brought into a position vertically beneath said tube, and into a position in front of said lateral pipe connection.

4. An apparatus for cultivating microorganisms, comprising a flask with top opening and lateral pipe connection; a stopper with two vertical bores inserted in said top opening; a rigid tube inserted in one of the bores of the stopper; and a rod slidingly and turnably inserted in the second bore of the stopper; a loop of a non-corrosive material fastened to the end of said rod within the flask, said loop being adapted to be brought into a position vertically beneath said tube, and into a position in front of said lateral pipe connection; a liquid-culture-medium storage vessel arranged above said flask; a tube connection between said vessel and the tube inserted in the stopper of the flask; and means for the intermittent supply of small quantities of liquid culture medium from said vessel to said loop.

5. An apparatus as claimed in claim 1, having a drain connected to its bottom part.

6. A microbiological process which comprises forming a circular lamella of liquid culture medium and inoculum, growing a culture of microorganisms in said lamella out of said inoculum under biotic conditions, gradually dropping further liquid culture medium on said lamella in excess of the capacity of the latter for supplying the growing culture with fresh amounts of nutritious substances, and ejecting from said lamella a portion of spent liquor containing products of metabolism of said growing culture and a portion of the microorganisms grown therein.

7. An apparatus for cultivating microorganisms, comprising a tubular vessel adapted to be mounted in vertical position; two aligned horizontal tubular extensions connected to said vessel; a rod inserted in each of said extensions with a tight fit, said rods being adapted to be turned and axially shifted within said extensions; a loop of a non-corrosive material fixed to each of said rods; at least one further horizontal tubular extension connected to said vessel substantially at right angles to said aligned extensions; means connected to the top of said vessel for gradually feeding liquid culture medium in small quantities into said vessel; said loops being adapted to be brought vertically beneath said feeding means, alternatingly above and beneath one another, and to be individually brought out of register with one another and with said feeding means, and in front of said further extension.

8. An apparatus as claimed in claim 7, wherein the lower part of said tubular vessel is drawn out into a tube of smaller diameter adapted to be inserted in the bore of a perforated flask-stopper.

9. An apparatus as claimed in claim 8, wherein each loop is part of a wire traversing the rod to which it is fixed and being adapted to be sterilized by the passage thereto of an electric current.

SAMUEL BARUCH LEVIN.

REFERENCES CITED

The following references are of record in the file of this patent:

UNITED STATES PATENTS

| Number | Name | Date |
| --- | --- | --- |
| 1,761,789 | Harrison | June 3, 1930 |
| 1,936,983 | Lilly | Nov. 28, 1933 |
| 1,991,993 | Werkman et al. | Feb. 19, 1935 |
| 2,123,463 | Effront | July 12, 1938 |
| 2,129,502 | McCreary | Sept. 6, 1938 |

OTHER REFERENCES

Clifton, Science, July 16, 1943, pages 69–70.

Thom, Oil and Drug Reporter, Jan. 5, 1944, pages 7 and 50.

Eimer and Amend, Laboratory Apparatus and Supplies, 1936, pages 312, 322, 325.